(12) United States Patent
Pleños et al.

(10) Patent No.: US 10,929,339 B2
(45) Date of Patent: Feb. 23, 2021

(54) GENERATION OF MULTIPLE WORKSHEET EXPORTATION

(71) Applicant: Yokogawa Electric Corporation, Musashino (JP)

(72) Inventors: Haydee Lavisores Pleños, Singapore (SG); Acelython Ordillo Navarro, Singapore (SG); Ying Tzu Huang, Singapore (SG)

(73) Assignee: Yokogawa Electric Corporation, Musashino (JP)

( * ) Notice: Subject to any disclaimer, the term of this patent is extended or adjusted under 35 U.S.C. 154(b) by 587 days.

(21) Appl. No.: 15/295,100

(22) Filed: Oct. 17, 2016

(65) Prior Publication Data

US 2018/0107671 A1 Apr. 19, 2018

(51) Int. Cl.
| | | |
|---|---|---|
| G06F 16/11 | (2019.01) | |
| G06F 16/13 | (2019.01) | |
| G05B 23/02 | (2006.01) | |

(52) U.S. Cl.
CPC ........ G06F 16/116 (2019.01); G05B 23/0272 (2013.01); G06F 16/13 (2019.01)

(58) Field of Classification Search
None
See application file for complete search history.

(56) References Cited

U.S. PATENT DOCUMENTS

| | | |
|---|---|---|
| 2007/0061786 A1 | 3/2007 | Zhou et al. |
| 2007/0106761 A1 | 5/2007 | Beoughter et al. |
| 2007/0130572 A1 | 6/2007 | Gilbert et al. |
| 2007/0132779 A1 | 6/2007 | Gilbert et al. |
| 2007/0139441 A1 | 6/2007 | Lucas et al. |
| 2007/0150081 A1 | 6/2007 | Nixon et al. |
| 2007/0165031 A1 | 7/2007 | Gilbert et al. |

(Continued)

FOREIGN PATENT DOCUMENTS

| | | |
|---|---|---|
| JP | 2007-536640 | 12/2007 |
| JP | 2011-501258 | 1/2011 |

OTHER PUBLICATIONS

Extended European Search Report dated Aug. 29, 2017 in European Patent Application No. 17150472.3.

(Continued)

*Primary Examiner* — Aleksandr Kerzhner
*Assistant Examiner* — Eddy Cheung
(74) *Attorney, Agent, or Firm* — Oblon, McClelland, Maier & Neustadt, L.L.P.

(57) ABSTRACT

A data processing system and method include processing circuitry configured to receive sensor data from a plurality of field devices and convert the sensor data to field data, receive a first source file having first field data exported from a first editor, receive a second source file having second field data exported from a second editor, filter the first and second field data according to one or more conditions, generate multiple worksheets based upon the one or more conditions of the filtered first and second field data, extract the filtered first and second field data from source fields of the first source file and the second source file and map the extracted first and second field data into related worksheet fields of the multiple worksheets, and export the multiple worksheets having the mapped and extracted first and second field data in an export file.

20 Claims, 10 Drawing Sheets

(56) References Cited

U.S. PATENT DOCUMENTS

| | | |
|---|---|---|
| 2007/0168060 A1 | 7/2007 | Nixon et al. |
| 2007/0168065 A1 | 7/2007 | Nixon et al. |
| 2007/0174225 A1 | 7/2007 | Blevins et al. |
| 2007/0179641 A1 | 8/2007 | Lucas et al. |
| 2007/0211079 A1 | 9/2007 | Nixon et al. |
| 2008/0066004 A1 | 3/2008 | Blevins et al. |
| 2008/0300698 A1 | 12/2008 | Havekost et al. |
| 2009/0018996 A1* | 1/2009 | Hunt ............... G06F 16/2264 |
| 2009/0077055 A1* | 3/2009 | Dillon .............. G06F 16/337 |
| 2010/0168874 A1 | 7/2010 | Lucas et al. |
| 2010/0188410 A1 | 7/2010 | Gilbert et al. |
| 2011/0252355 A1 | 10/2011 | Nixon et al. |
| 2014/0115195 A1* | 4/2014 | Higham ............. G06F 13/28 |
| | | 710/22 |
| 2016/0098037 A1* | 4/2016 | Zornio .......... G05B 19/41855 |
| | | 700/20 |
| 2016/0330291 A1* | 11/2016 | Asenjo .............. H04L 65/403 |

OTHER PUBLICATIONS

Office Action dated Sep. 8, 2020 issued in corresponding Japanese patent application 2017-001647.

* cited by examiner

Source File 01

| Tag Identifier | Field02 | Field03 | Field04 |
|---|---|---|---|
| TI_001 | Value02 | Value03 | Value04 |
|  | Value12 | Value13 | Value14 |
| TI_003 | Value22 | Value23 | Value24 |
| TI_004 | Value32 | Value33 | Value34 |
| TI_005 | Value42 | Value43 | Value44 |
|  | Value52 | Value53 | Value54 |
| TI_007 | Value62 | Value63 | Value64 |
| TI_008 | Value72 | Value73 | Value75 |

Source File 02

| Tagname | Field22 | Field23 | Field24 |
|---|---|---|---|
| TI_001 | Value021 | Value031 | Value041 |
|  | Value121 | Value131 | Value141 |
| TI_003 | Value221 | Value231 | Value241 |
| TI_004 | Value321 | Value331 | Value341 |
| TI_005 | Value421 | Value431 | Value441 |
|  | Value521 | Value531 | Value541 |
| TI_007 | Value621 | Value631 | Value641 |
| TI_008 | Value721 | Value731 | Value751 |

Fig. 6

Worksheet01

| WF01 | WF02 | WF03 |
|---|---|---|
| *Tag Identifier/Tagname* | *Field02* | *Field23* |
| TI_001 | Value02 | Value031 |
| TI_003 | Value22 | Value231 |
| TI_004 | Value32 | Value331 |
| TI_005 | Value42 | Value431 |
| TI_007 | Value62 | Value631 |
| TI_008 | Value72 | Value731 |

Worksheet01

| WF01 | WF02 | WF03 |
|---|---|---|
|  |  |  |
|  |  |  |
|  |  |  |
|  |  |  |
|  |  |  |
|  |  |  |

Fig. 7

Worksheet01

| WF01 | WF02 | WF03 |
|---|---|---|
| TI_001 | Value02 | Value031 |
| TI_003 | Value22 | Value231 |
| TI_004 | Value32 | Value331 |
| TI_005 | Value42 | Value431 |
| TI_007 | Value62 | Value631 |
| TI_008 | Value72 | Value731 |

Worksheet02

| WF02 | WF04 | WF05 |
|---|---|---|
| TI_001 | Value03 | Value041 |
| TI_003 | Value23 | Value241 |
| TI_004 | Value33 | Value341 |
| TI_005 | Value43 | Value441 |
| TI_007 | Value63 | Value641 |
| TI_008 | Value73 | Value741 |

Fig. 8

GENERATION OF MULTIPLE WORKSHEET EXPORTATION

BACKGROUND

In a plant or factory, a process control system controls various state quantities (pressure, temperature, flow rate, and the like) in an industrial process, which usually includes a high level of automated executions. In such a process control system, on-site devices called field devices (such as a measuring device, an actuator, or the like) are connected to a controller via an I/O module. The controller controls a manipulation device (for example, an actuator) based on the measurement result of a measuring device (for example, a sensor) to control the various state quantities described above.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

In one embodiment, a data processing system includes processing circuitry configured to receive sensor data from a plurality of field devices and convert the sensor data to field data, receive a first source file having first field data exported from a first editor, receive a second source file having second field data exported from a second editor, filter the first and second field data according to one or more conditions, generate multiple worksheets based upon the one or more conditions of the filtered first and second field data, extract the filtered first and second field data from source fields of the first source file and the second source file and map the extracted first and second field data into related worksheet fields of the multiple worksheets, and export the multiple worksheets having the mapped and extracted first and second field data in an export file.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 illustrates two source tables according to an embodiment;

FIG. 7 illustrates the creation of a worksheet according to an embodiment;

FIG. 8 illustrates two exemplary worksheet tables according to an embodiment;

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

In the interest of clarity, not all of features of the implementations described herein are shown and described in detail. It will be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Embodiments described herein provide systems and methods in which a single user input can export data from multiple sources, such as multiple editor source files. Files are cached so that multiple source files can be used concurrently. Data from the source files is filtered to obtain an efficient export of required data to be used for testing or other purposes. Concurrent export from multiple sources can be implemented to multiple worksheets, as opposed to a single consecutive export in a conventional export process in which data in live sources cannot be manipulated. The resulting export file has more organized export data with its data association intact and manageable. The export data can subsequently be used directly as import data with no further manipulation of the data.

Different data from different sources may be required for different export files. Embodiments described herein provide efficient filtering and consolidating of the data, as opposed to dumping all of the data into a single worksheet in conventional processing. Embodiments described herein also provide for additional source files to be conveniently added at a subsequent time.

Figure 1:
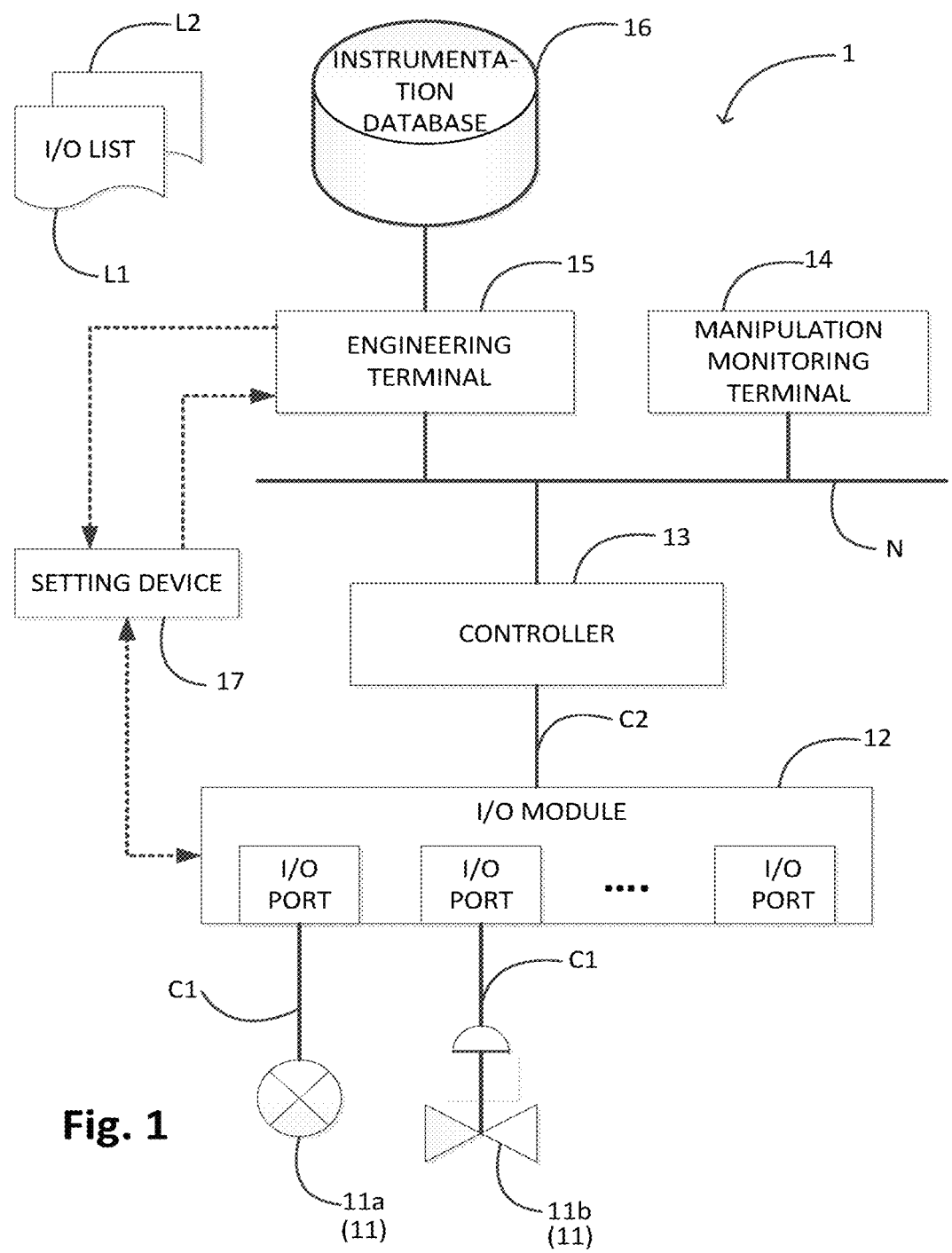
FIG. 1 is a block diagram illustrating a configuration of a related process control system according to an embodiment.

FIG. 1 is a block diagram illustrating a configuration of a related process control system. As illustrated in FIG. 1, the process control system 1 includes field devices 11, an I/O module 12, a controller 13, a manipulation monitoring terminal 14, an engineering terminal 15, and an instrumentation database 16. The controller 13 controls the field devices 11 according to instructions from the manipulation monitoring terminal 14. Various settings of the I/O module 12 and the field devices 11 are performed by a setting device 17.

The field devices 11 and the I/O module 12 are connected to a transmission line C1, and the I/O module 12 and the controller 13 are connected to a cable C2. The controller 13, the manipulation monitoring terminal 14, the engineering terminal 15, and the instrumentation database 16 are connected to a control network N. The control network N can be a network that connects between the site of the plant and the monitoring room.

The field device 11 can be a sensor device such as a flow meter, a temperature sensor, a valve device (such as a flow control valve), an on-off valve, an actuator device (such as a fan), a motor, or other devices installed in the plant. An example of controlling the flow rate of a fluid in the industrial process is given herein. In FIG. 1, a sensor device 11a for measuring the flow rate of the fluid and a valve device 11b for controlling (operating) the flow rate of the fluid are illustrated among the plurality of field devices 11.

The I/O module 12 is provided between the field devices 11 and the controller 13. The I/O module 12 performs the signal processing of signals transmitted between the field devices 11 and the controller 13. For example, a signal obtained from the field device 11 is converted into a signal that can be received by the controller 13. The plurality of field devices 11 are connected to the controller 13 via the I/O module 12. The I/O module 12 is a module that relays between the signal input/output by the field devices 11 and the signal input/output by the controller 13. Details of the I/O module 12 are described herein.

The controller 13 controls the field devices 11 by communicating with the field devices 11 in accordance with instructions from the manipulation monitoring terminal 14. Specifically, the controller 13 acquires a process value measured by the field devices 11 (for example, a sensor device 11a). The controller 13 calculates an operation amount for operating the other field device 11 (for example, a valve device 11b) and transmits the operation amount to the other field device 11, thereby controlling the other field device 11 (the valve device 11b).

The manipulation monitoring terminal 14 is used for monitoring the process operated by a plant operator, for example. Specifically, the manipulation monitoring terminal 14 acquires input/output data of the field devices 11 from the controller 13, communicates the behavior of the field devices 11 and the controller 13 to the plant operator, and controls the controller 13 based on the instructions from the plant operator.

The engineering terminal 15 generates information pertaining to the field devices 11, the I/O module 12, and the controller 13 based on the design information (such as the design information of the plant, including the process control system 1) stored in the instrumentation database 16. I/O lists L1 and L2 relating to the transmission between the field devices 11 and the I/O modules 12 are examples of the information generated by the engineering terminal 15. The instrumentation database 16 stores the above-described design information to be referenced in the engineering terminal 15.

The setting device 17 applies various settings to the field devices 11 and the I/O module 12 when building the process control system 1 by using the I/O lists L1 and L2 acquired from the engineering terminal 15. The connection test between the field devices 11 and the I/O module 12 can be performed by using the setting device 17 when the controller 13 is not connected to the I/O module 12.

In a control system for an industrial plant, there are multiple databases in an engineering server. Each editor has a database for various components of the control system, such as an I/O editor and an I/O module (IOM) editor. Editors are used to prepare, maintain, and modify configurations or settings, based on design data in a process control system for an industrial plant, process, or equipment. An I/O editor configures I/O signals to field devices. An IOM editor configures I/O modules.

During testing or execution of the control system, design data from multiple databases are required. As a result, there can be duplicate information or different information in different databases. For example, a device (IOM) Identifier and a device (IOM) Type can be in one database. However, characteristics of the device (IOM) Type can be in another database.

The data in multiple sources can be related with either the same field parameters or different parameters. For the same field parameters in multiple sources, labels (i.e. fieldnames) of parameters can be different. As a result, it is cumbersome and time consuming to extract the data, which is required for one output file, from multiple sources. A user needs to match the labels from common parameters to determine the related parameters. A user also needs to identify duplicate data, resulting from different labels, so that the duplicate data is not extracted to the output file unnecessarily.

An editor in an export function will dump all of the data from one source onto a single worksheet of an export file. The data is not grouped into multiple worksheets. In addition, other associated fields from a different source (i.e. different editor) are not exported. As a result, a user needs to open each source one at a time (i.e. one editor at a time) to implement the data exporting. Multiple export files are generated, one from each source. Generating multiple export files can lead to confusing or unmanageable data content.

In some related practices, design data which is required for testing or execution is exported from multiple databases and filtered manually. In an example, a device (IOM) Type for a device (an I/O device) is defined in a database of a source (an I/O Editor). Characteristics (Node, Types, etc.) for a device (an IOM) type are defined in a database of a source (an IOM Editor). In order to prepare an import file for a list of devices (I/O devices) with corresponding information (associated and/or related data) requires identifying the list of devices (I/O devices) from the database of a first source (an I/O Editor). Corresponding information is then extracted from the database of a second source (an IOM Editor).

Figure 2:
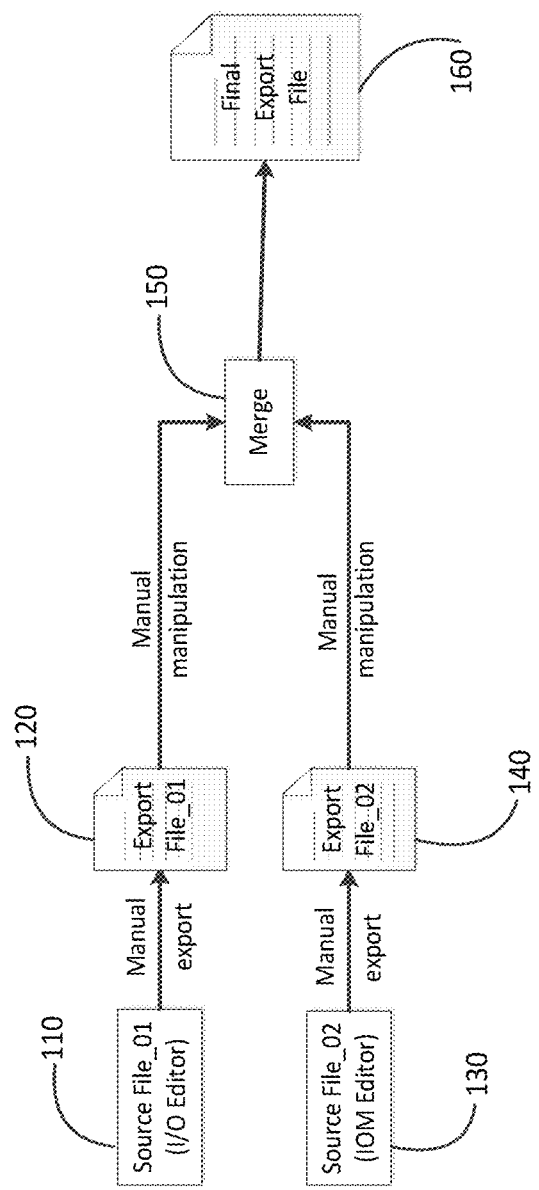
FIG. 2 illustrates a related extraction and flow of data from multiple editors of multiple source files according to an embodiment.

FIG. 2 illustrates a related process for extraction and flow of data from multiple editors of multiple source files used for testing or execution purposes. Data from a first source file 110, such as an I/O Editor is manually exported to a first export file 120 for manual manipulation. Data from a second source file 130, such as an IOM Editor is also manually exported to a second export file 140 for manual manipulation. Data from the first export file 120 and the second export file 140 are merged into a single worksheet 150 and to a final export file 160.

A typical industrial plant may have thousands of field devices. The design data exported for a typical industrial plant can be massive and confusing, and it requires a great deal of effort to filter data from the many different source files. In addition, different databases can be stored in different formats, which requires still more effort to obtain the required data from the different sources.

A related control system requires user knowledge of manual manipulation of source files to identify related data. Export files are also generated one at a time and can be of different formats, depending upon a client that is used for the export file.

Figure 3:
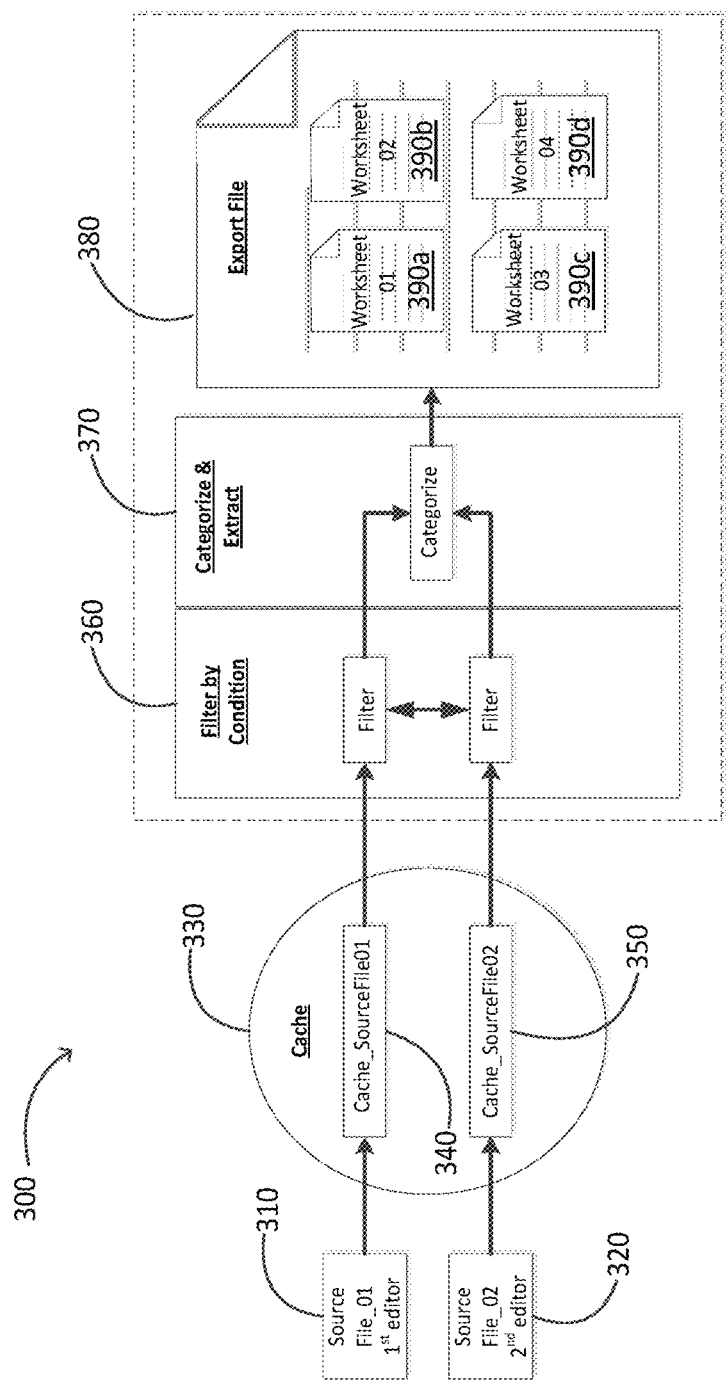
FIG. 3 is a schematic diagram of a data processing system according to an embodiment.

FIG. 3 is a schematic diagram of a data processing system 300 according to embodiments described herein. Data from multiple source files is retrieved. Data is retrieved from a first source file 310, such as an I/O Editor source file and data is retrieved from a second source file 320, such as an IOM Editor source file. An I/O Editor is configured to transfer I/O signals to and from one or more field devices within an industrial system supported by the data export system 300. An IOM Editor is configured to control each of the I/O modules within the industrial system.

The retrieved data from the first editor file 310 is forwarded to a cache 330 as a first cached source file 340. The retrieved data from the second editor file 320 is concurrently run through the cache 330 as a second cached source file 350. FIG. 3 illustrates just two source files concurrently cached for ease of illustration. However, more than two source files can be concurrently cached for subsequent export.

Each of the cached source files 340 and 350 are filtered 360 using previously determined conditions for each respective cached source file. Each respective filter is based on required data for the target export files. Conditions for filtering can be a set of rules which are editable, i.e. configurable.

A first example for a condition is the field device (I/O) identifier (I/O Tag) needs to be valid. An objective for this filter is to filter field device (I/O) data which does not have a field device (I/O) identifier. The I/O Editor can accept configuration of signals from field devices without an I/O Tag. However, the field device is not valid when the field device (I/O) identifier field is empty.

A second example for a condition is to check if the required source file is available. A first source file may have field device type information and a second source file may have field device settings. The second example condition is defined to check if both the first and second source files are available. When the second source file is not available, the associated data from the second source file is not included in target export files.

Additional examples of conditions for a respective filter include the following. A third condition can determine whether an I/O Tag has an IOM assignment in the I/O Editor. For example, is the IOM assigned to a project, a station, or a node and on which unit and/or slot and channel is it assigned? A fourth condition determines whether the node used in the I/O Editor exists or is defined in the IOM Editor. A fifth condition determines whether the IOM used in the I/O Editor exists or is defined in the I/O Editor.

Categorization 370 is implemented with the filtered data. Categorization 370 generates multiple separate worksheets in a single export file 380. In addition, two or more export files 380 can be generated, wherein each export file 380 has multiple worksheets 390*a*-390*d*. Each worksheet 390*a*-390*d* is prepared by defining required fields for the target export file 380. In an embodiment, each worksheet 390*a*-390*d* is different from another worksheet 390*a*-390*d* by at least one different field.

When multiple export files 380 are generated, one or more export files 380 may have a different format from another export file 380. In an embodiment, a conversion step can be implemented after the categorization 370 to convert the export files 380 to a single format. In another embodiment, a conversion step for multiple source file formats can be implemented before the filtering 360 to convert the export files 380 to a single format.

For each worksheet 390*a*-390*d*, associated and related data are extracted from the multiple source files, such as the first source file 310 and the second source file 320, based on the defined required fields. In an embodiment, the extraction is implemented based on mapping, as described herein.

Figure 4:
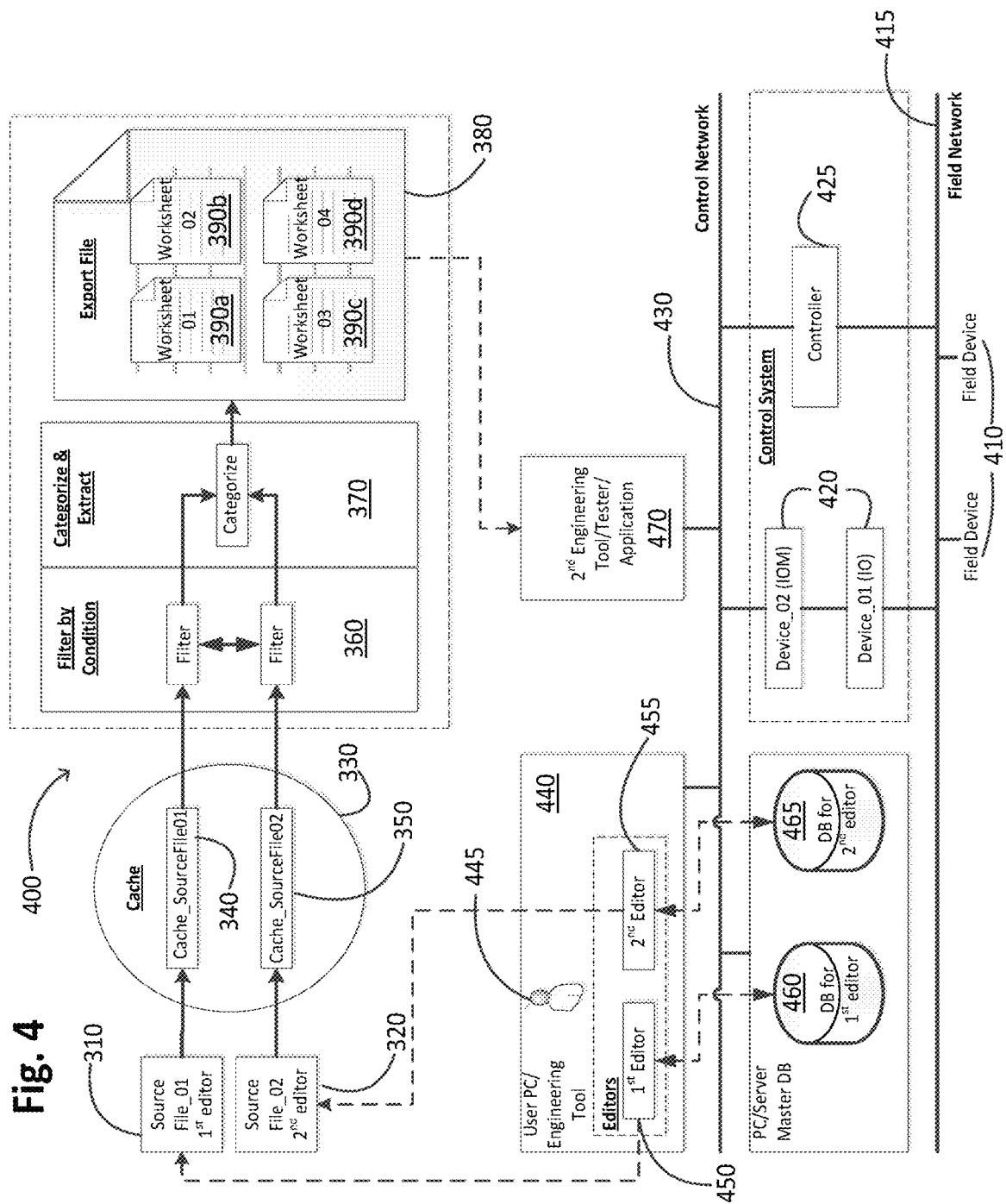
FIG. 4 is a schematic diagram of a data generation system according to an embodiment.

FIG. 4 is a schematic diagram of a data generation system 400 according to embodiments described herein. The upper half of FIG. 4 was previously described with reference to FIG. 3. The lower half of FIG. 4 is a schematic of supporting hardware for the data export system 400.

FIG. 4 illustrates a plurality of field devices 410, such as an actuator or a sensor. FIG. 4 illustrates just two field devices 410 for simplicity. However, an actual industrial plant may have hundreds or thousands of field devices 410. Each field device 410 is connected to other field devices 410 and to other components of the data export system 400 via a field network 415.

A control system of the data export system 400 includes control devices 420 configured to receive and convert signals from the field devices 410. Examples of control devices 420 include an I/O control device and an IOM control device. A controller 425 is configured with processing circuitry to manipulate and control the field devices 410 and 420. A control network 430 interconnects the control system with other components of the data export system 400.

A first engineering tool 440 includes an interface tool for a user 445 to provide instructions to the data export system 400. In an embodiment, the first engineering tool 440 is configured with processing circuitry for a user to export source files for a mass update and import the updated files. In another embodiment, the first engineering tool 440 is configured with processing circuitry for a user to export source files for a mass edit and retrieve the edited files.

The first engineering tool 440 also includes editors, such as a first editor 450 and a second editor 455. Only two editors are shown in FIG. 4 for ease of illustration. However, more than two editors are contemplated by embodiments described herein.

In an embodiment, the first editor 450 is an I/O Editor, which is configured to provide one or more source files 310 to be cached 330. The first editor 450 also has access to a first editor database 460, via the control network 430, in a PC/server master database component of the data export system 400. In an embodiment, the second editor 455 is an TOM Editor, which is configured to provide one or more source files 320 to be cached 330. The second editor 455 also has access to a second editor database 465, via the control network 430. In another embodiment, the first editor database 460 and the second editor database 465 could be a single combined database.

The data export system 400 also includes a second engineering tool 470. The second engineering tool 470 is configured with processing circuitry to receive results from the export file 380 containing the worksheets 390*a*-390*d*. The worksheets 390*a*-390*d* can be used in a plant diagnostic application, plant monitoring application, a validation application, or a test application for example, via the second engineering tool 470.

Figure 5:
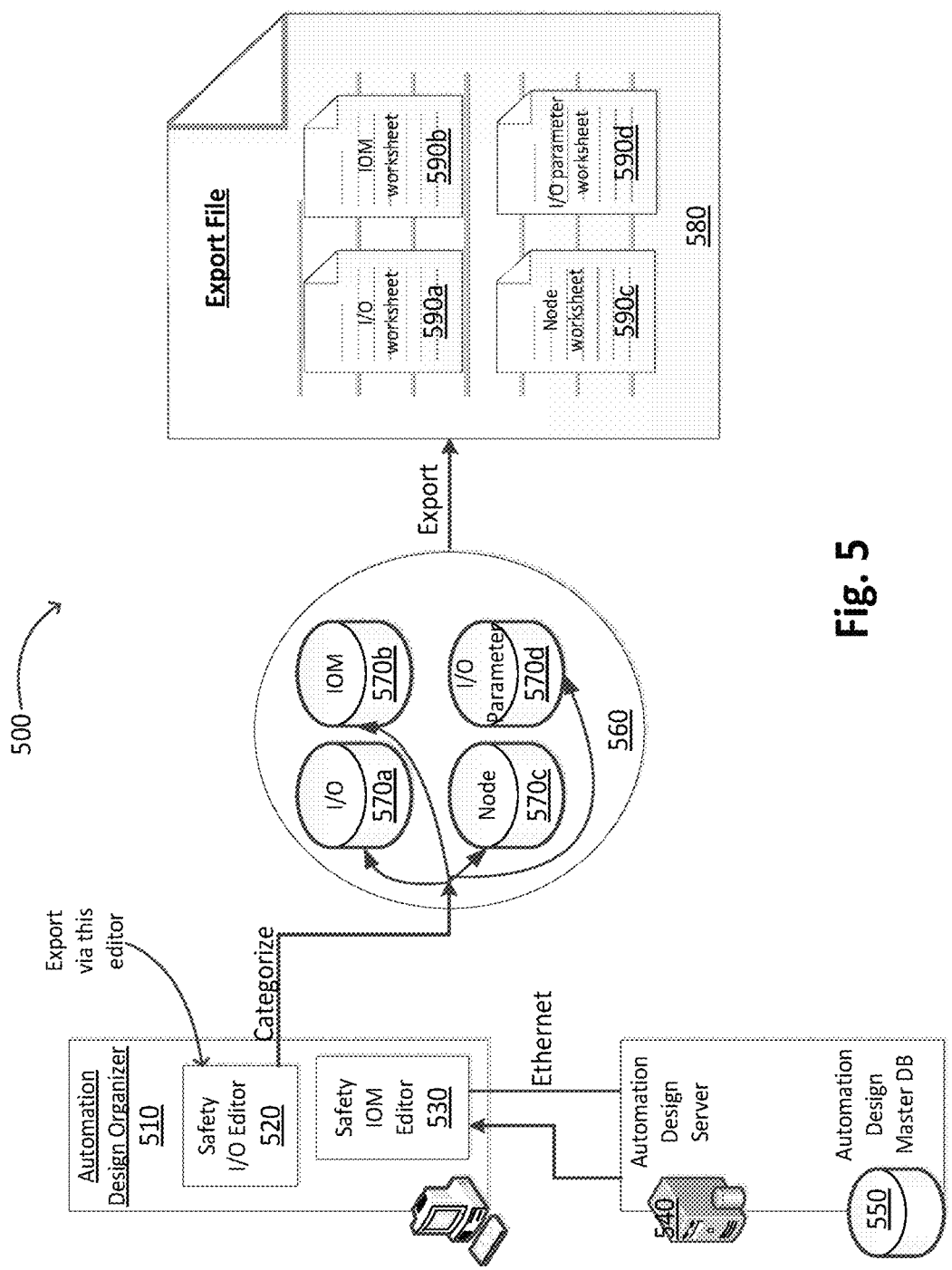
FIG. 5 illustrates an implementation of a product through a data export system according to an embodiment.

FIG. 5 illustrates an implementation of a product through a data export system 500. FIG. 5 is given for illustrative purposes only. Embodiments described herein are not limited by the features and components illustrated in FIG. 5. A user engineering tool 510, such as an automation design organizer is configured to receive user instructions. A first editor 520, such as a safety I/O Editor and a second editor 530, such as a safety IOM editor are illustrated. The first editor 520 and the second editor 530 are connected to an automation design server 540 and an automation design master database 550.

The first editor 520 is configured to provide one or more source files to be cached, as previously illustrated in FIG. 4. The first editor 520 is controlled by the automation design server 540 and has access to the automation design master database 550. Likewise, the second editor 530 is configured to provide one or more source files to be cached, as illustrated in FIG. 4. The second editor 530 is controlled by the automation design server 540 and has access to the automation design master database 550.

One or more source files from the first editor 520 and the second editor 530 are concurrently cached, as previously illustrated in FIG. 4. Results are filtered according to defined conditions, as described herein.

Filtered results are categorized 560 into multiple categories in preparation for exportation. FIG. 5 illustrates an I/O category 570*a*, an IOM category 570*b*, a node category 570*c*, and an I/O parameter category 570*d*.

The categories 570*a*-570*d* are exported into an export file 580. Export file 580 contains multiple worksheets 590*a*-590*d* corresponding to the categories 570*a*-570*d*. Criteria used to define a worksheet can be based on data expected to be in the associated worksheet by the second engineering tool 470. To meet the requirements, a list of what data goes into which worksheet is maintained by the editor in which the exporting is being implemented. In an embodiment, the second engineering tool 470 is a multi-editor application. As a result, a basic premise of creating the worksheet is that one of the worksheets must be an input to at least one of its editors. In FIG. 5, the worksheets include an I/O worksheet 590*a*, an IOM worksheet 590*b*, a node worksheet 590*c*, and an I/O parameter worksheet 590*d*.

The fields required for the multiple worksheets 590*a*-590*d* are defined in the categorization 560. In an embodiment, the fields are implemented by hardcoding. For example, Worksheet01 can be hardcoded to have fields WF01, WF02, and WF03. In another embodiment, the fields can be defined using a configuration file. In the categorization 560, worksheets are prepared and data is subsequently extracted from source files to the worksheets.

FIG. 6 illustrates two source tables. A first table is Source File 01 labeled "Tag Identifier" which contains Field02, Field03, and Field04. A second table is Source File 02 labeled "Tag name" which contains Field22, Field23, and Field24.

FIG. 7 illustrates the creation of a worksheet. A first table for Worksheet01 includes worksheet fields WF01, WF02, and WF03. A second table includes data extracted from the Source File 01 ("Tag Identifier") and Source File 02 ("Tag name") into Worksheet01. Field WF02 of Worksheet01 corresponds to Field02 extracted from Source File 01. Field WF03 of Worksheet01 corresponds to Field23 extracted from Source File 02.

FIG. 7 illustrates two exemplary tables having map fields WF01, WF02, and WF03. The fields may be named differently in the multiple source files (SFs). For example, WF01 is a Tag Identifier in SF01 and is a Tag name in SF02. WF02 is data in a field associated with Field02 in SF01. WF03 is data in a field associated with Field23 in SF02. Mapping identifies the data for Field02 that can be extracted from Tag Identifier in SF01, and mapping identifies the data for Field23 that can be extracted from Tag name in SF02. The extracted data is written to Worksheet 01.

In another example of mapping, a field device (IOM) field may be labeled as "device (I/O) Tag" in a first (I/O) source file and be labeled as "name" is a second (IOM) source file. The mapping enables required related data to be prepared in each worksheet. For example, an export file may require a list of field devices (I/Os) and the characteristics of each field device (I/O). The list of valid field devices (I/Os) may be obtained from the (I/O) source file. For each field device (I/O), based on the field device value in a first source file (I/O value in IOM source file labeled "name"), the characteristics of the I/O is obtained from the IOM source file and subsequently updated in each worksheet.

FIG. 8 illustrates two exemplary worksheet tables. A first table is Worksheet01 of an export file, previously illustrated in FIG. 7. A second table is Worksheet02, which was exported with Worksheet01 as part of the same export file.

Figure 9:
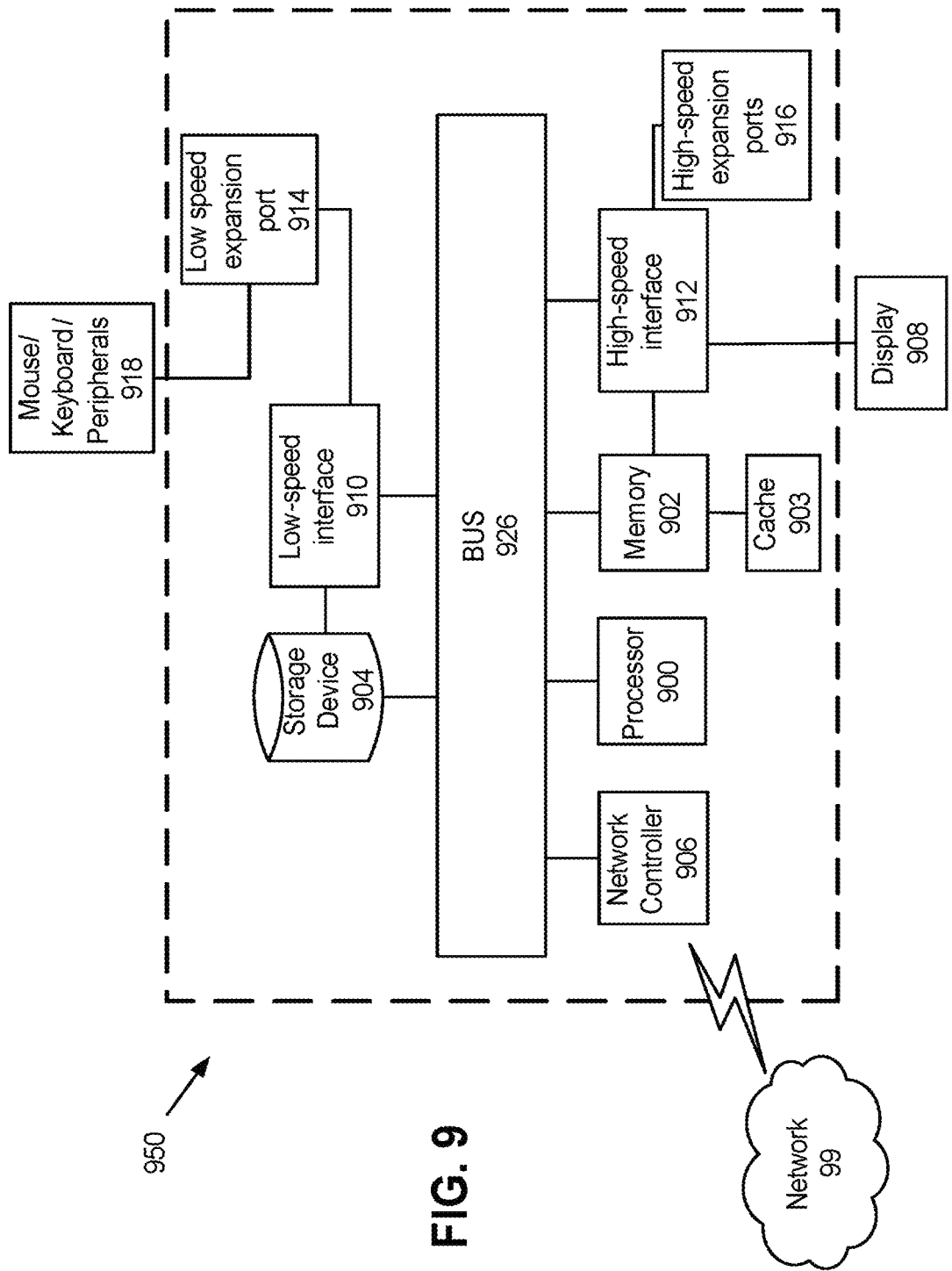
FIG. 9 is a schematic of an exemplary computing device according to an embodiment.

FIG. 9 is a schematic of an exemplary computing device 950, such as first engineering tool 440, second engineering tool 470, controller 425, automation design server 540, automation design master database 550, and automation design organizer 510, all of which can be used to implement the techniques described herein. The computing device 950 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

The computing device 950 includes a processor 900, a memory 902, cache 903, a storage device 904, a high-speed interface 912 connecting to the memory 902 and multiple high-speed expansion ports 916, and a low-speed interface 910 connecting to a low-speed expansion port 914 and the storage device 904. Each of the processor 900, the memory 902, cache 903, the storage device 904, the high-speed interface 912, the high-speed expansion ports 916, and the low-speed interface 910 are interconnected using various buses, such as communication bus 926, and may be mounted on a common motherboard or in other manners as appropriate.

The processor 900 can process instructions for execution within the computing device 950, including instructions stored in the memory 902 or on the storage device 904 to display graphical information for a GUI on an external input/output device, such as a display 908 coupled to the high-speed interface 912. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 902 stores information within the computing device 950. In some implementations, the memory 902 is a volatile memory unit or units. In some implementations, the memory 902 is a non-volatile memory unit or units. The memory 902 can also be another form of computer-readable medium, such as a magnetic or optical disk.

Cache 903 is used by processor 900 to reduce the average time or energy to access data from memory 902. Cache 903 is generally smaller and faster than memory 902. Cache 903 stores copies of data from frequently used locations in memory 902. Cache 903 can be an independent cache and can include an instruction cache and a data cache. The data cache can be organized as a hierarchy of multiple cache levels. When processor 900 needs to read from or write to a location in memory 902, it first checks whether a copy of the data is in cache 903. If so, processor 900 reads from or writes to cache 903, which is much faster than reading from or writing to memory 902.

The storage device 904 is capable of providing mass storage for the computing device 950. In some implementations, the storage device 904 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 900), perform one or more methods, such as those described above. The instructions can also be stored by one or more storage devices, such as computer- or machine-readable mediums (for example, the memory 902, the storage device 904, or memory on the processor 900).

The high-speed interface 912 manages bandwidth-intensive operations for the computing device 950, while the low-speed interface 910 manages lower bandwidth-intensive operations. Such allocation of functions is an example only. In some implementations, the high-speed interface 912 is coupled to the memory 902, the display 908 (e.g., through a graphics processor or accelerator), and to the high-speed expansion ports 916, which may accept various expansion cards (not shown). In the implementation, the low-speed interface 910 is coupled to the storage device 904 and the low-speed expansion port 914. The low-speed expansion port 914, which can include various communication ports (e.g., USB, Bluetooth, Ethernet, wireless Ethernet) can be coupled to one or more input/output devices 918, such as a keyboard, a pointing device, a scanner, or a networking device such as a switch or router, e.g., through a network adapter.

The computing device 950 also includes a network controller 906, such as an Intel Ethernet PRO network interface card from Intel Corporation of America, for interfacing with a network 99. As can be appreciated, the network 99 can be a public network, such as the Internet, or a private network such as an LAN or WAN network, or any combination thereof and can also include PSTN or ISDN sub-networks. The network 99 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the computing device of FIG. 9 is described as having a storage medium device 904, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 908 (e.g., a CRT (cathode ray tube) or LCD (liquid crystal display) monitor) for displaying information to the user and a keyboard and a pointing device 918 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

Figure 10:
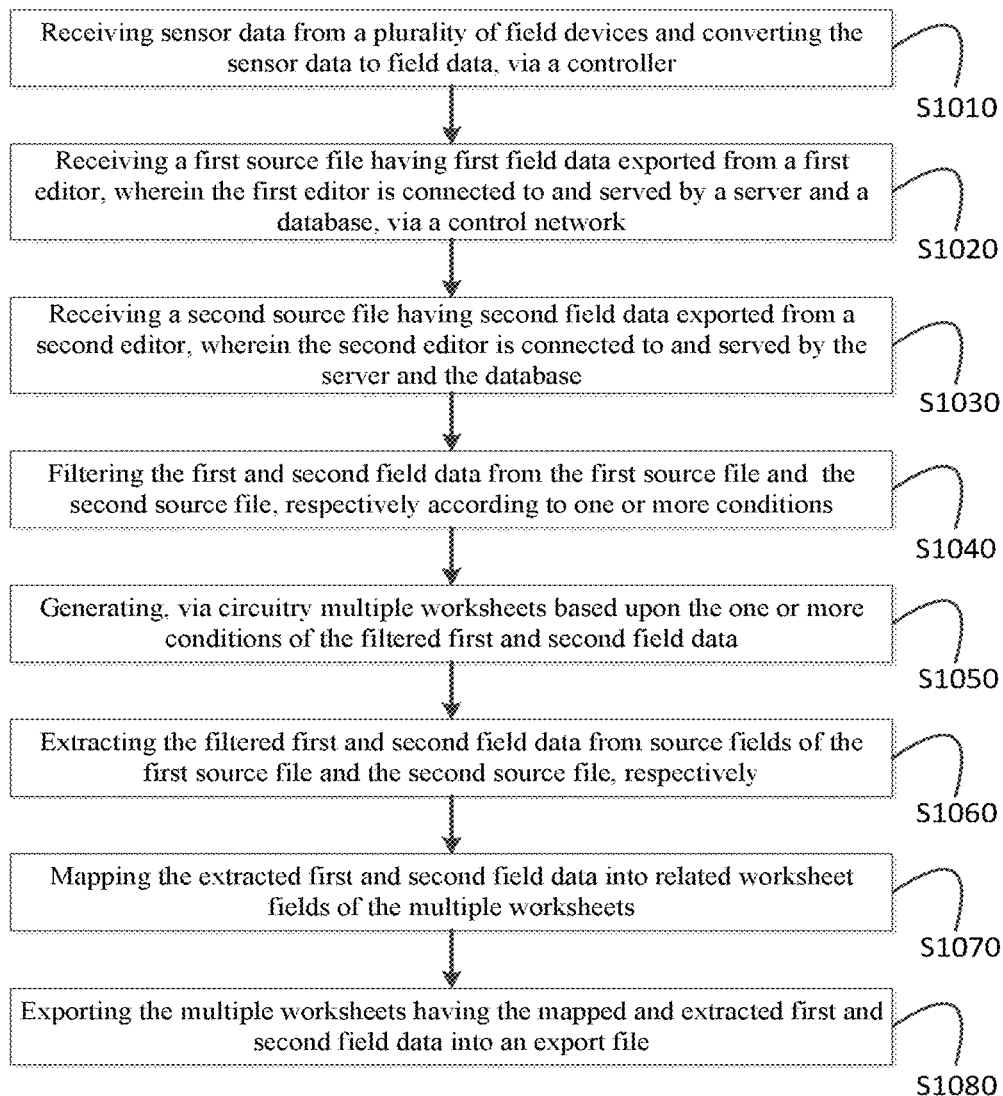
FIG. 10 is a flowchart of an exemplary method of exporting data according to an embodiment.

FIG. 10 is a flowchart of an exemplary method 1000 of processing data. In step S1010, sensor data is received from a plurality of field devices, such as an actuator or a sensor, and is converted to field data, via a controller. Each field device is connected to other field devices and to other components of the data export system via a field network.

In step S1020, a first source file having first field data exported from a first editor is received. An exemplary first editor is an I/O editor. The first editor is connected to and served by a server and a database, via a control network.

In step S1030, a second source file having second field data exported from a second editor is received. An exemplary second editor is an IOM editor. The second editor is connected to and served by the server and the database, via the control network.

In step S1040, the first and second field data from the first source file concurrently cached with the second source file are filtered according to one or more conditions. Each of the cached source files is filtered using previously determined conditions for each respective cached source file. Each respective filter is based on required data for target export files.

In step S1050, multiple worksheets are generated, via circuitry, based upon the one or more conditions of the filtered first and second field data. Conditions can include determining whether a device identifier is valid, a required source file is available, an I/O tag in the first editor has an IOM assignment, a node used in the first editor exists in the second editor, and the IOM used in the first editor exists in the second editor.

In step S1060, the filtered first and second field data are extracted from source fields of the first source file and the second source file. The source fields allow selection and extraction of specific field data, which is subsequently matched with a related worksheet field of a worksheet.

In step S1070, the extracted first and second field data are mapped into related worksheet fields of the multiple worksheets. The one or more conditions determine how the source data from the source files are mapped to an associated worksheet.

In step S1080, the multiple worksheets having the mapped and extracted first and second field data are exported into an export file. The export file can include a variable number of worksheets, which will depend in part on the number of source files. The export file can be directly imported to another system component for additional processing.

The hardware description above illustrated in FIG. 9 constitutes or includes specialized corresponding structure that is programmed or configured to perform the algorithm illustrated in FIG. 10. For example, the algorithm illustrated in FIG. 10 may be completely performed by the circuitry included in the single device illustrated in FIG. 9 or a corresponding chipset.

Embodiments described herein provide systems and methods in which a single user input can export data from multiple sources, such as multiple editor source files. Files are cached so that multiple source files can be used concurrently. Data from the source files is filtered to obtain an efficient export of required data to be used for testing or other purposes. Concurrent export from multiple sources can be implemented to multiple worksheets, as opposed to a single consecutive export in a conventional export process in which data in live sources cannot be manipulated. The resulting export file has more organized export data with its data association intact and manageable. The export data can subsequently be used directly as import data with no further manipulation of the data.

Different data from different sources may be required for different export files. Embodiments described herein provide efficient filtering and consolidating of the data, as opposed to dumping all of the data into a single worksheet in conventional processing. Embodiments described herein also provide for additional source files to be conveniently added at a subsequent time.

Embodiments described herein include the following aspects.

(1) A data processing system includes processing circuitry configured to receive sensor data from a plurality of field devices and convert the sensor data to field data, receive a first source file having first field data exported from a first editor, receive a second source file having second field data exported from a second editor, filter the first and second field data according to one or more conditions, generate multiple worksheets based upon the one or more conditions of the filtered first and second field data, extract the filtered first and second field data from source fields of the first source file and the second source file and map the extracted first and second field data into related worksheet fields of the multiple worksheets, and export the multiple worksheets having the mapped and extracted first and second field data in an export file.

(2) The data processing system of (1), wherein the processing circuitry is further configured to export the export file to an engineering tool for subsequent data processing.

(3) The data processing system of either (1) or (2), wherein the subsequent data processing includes at least one of a plant diagnostic application, a plant monitoring application, a validation application, and a testing application.

(4) The data processing system of any of (1) through (3), wherein the first editor is an input/output (I/O) editor to configure I/O signals for the plurality of field devices.

(5) The data processing system of any of (1) through (4), wherein the second editor is an I/O module (IOM) editor.

(6) The data processing system of any of (1) through (5), further includes a cache configured to concurrently receive the first and second field data from the first source file and the second source file, respectively; a server connected to the first editor and the second editor, via a control network; and one or more databases connected to the first editor and the second editor, via the control network.

(7) A method of processing data includes receiving sensor data from a plurality of field devices and converting the sensor data to field data, via a controller; receiving a first source file having first field data exported from a first editor, wherein the first editor is connected to and served by a server and a database, via a control network; receiving a second source file having second field data exported from a second editor, wherein the second editor is connected to and served by the server and the database; filtering the first and second field data from the first source file and the second source file, respectively according to one or more conditions; generating, via circuitry multiple worksheets based upon the one or more conditions of the filtered first and second field data; extracting the filtered first and second field data from source fields of the first source file and the second source file, respectively; mapping the extracted first and second field data into related worksheet fields of the multiple worksheets; and exporting the multiple worksheets having the mapped and extracted first and second field data into an export file.

(8) The method of (7), wherein the one or more conditions include at least one of determining whether a device identifier is valid, a required source file is available, an I/O tag in the first editor has an TOM assignment, a node used in the first editor exists in the second editor, and the IOM used in the first editor exists in the second editor.

(9) The method of either (7) or (8), further including forwarding the export file into an engineering tool for subsequent data processing.

(10) The method of any of (7) through (9), wherein the subsequent data processing includes at least one of a plant diagnostic application, a plant monitoring application, a validation application, and a testing application.

(11) The method of any of (7) through (10), wherein the first editor is an input/output (I/O) editor to configure I/O signals for the plurality of field devices.

(12) The method of any of (7) through (11), wherein the second editor is an I/O module (IOM) editor.

(13) The method of any of (7) through (12), wherein the multiple worksheets include at least one of a device input/output (I/O) worksheet, a device I/O parameter worksheet, a node worksheet, and an I/O module (IOM) worksheet.

(14) The method of any of (7) through (13), wherein the extracted first and second field data is received from a configuration table.

(15) A data generation system includes a first editor configured to retrieve data from a first database for processing a first source file, a second editor configured to retrieve data from a second database for processing a second source file, and processing circuitry. The processing circuitry is configured to filter first field data from the first source file and second field data from the second source file according to one or more conditions, generate multiple worksheets and associated worksheet fields based upon the one or more conditions, extract the first and second field data from source fields of the first source file and the second source file, respectively, map the extracted first and second field data into the associated worksheet fields of the multiple worksheets, and export the multiple worksheets having the mapped and extracted first and second field data into an export file.

(16) The data generation system of (15), wherein the first and second field data were converted from sensor data received from a plurality of field devices, via a controller.

(17) The data generation system of either (15) or (16), wherein the first editor is an input/output (I/O) editor to configure I/O signals for the plurality of field devices.

(18) The data generation system of any of (15) through (17), wherein the second editor is an I/O module (IOM) editor.

(19) The data generation system of any of (15) through (18), further includes an engineering tool configured with processing circuitry to receive the export file for subsequent data processing.

(20) The data generation system of any of (15) through (19), wherein the subsequent data processing includes at least one of a plant diagnostic application, a plant monitoring application, a validation application, and a testing application.

(21) A computer-readable medium having computer-executable instructions embodied thereon, that when executed by a computing device, performs a method of receiving sensor data from a plurality of field devices and converting the sensor data to field data, via a controller; receiving a first source file having first field data exported from a first editor, wherein the first editor is connected to and served by a server and a database, via a control network; receiving a second source file having second field data exported from a second editor, wherein the second editor is connected to and served by the server and the database; filtering the first and second field data from the first source file and the second source file, respectively according to one or more conditions; generating, via circuitry multiple worksheets based upon the one or more conditions of the filtered first and second field data; extracting the filtered first and second field data from source fields of the first source file and the second source file, respectively; mapping the extracted first and second field data into related worksheet fields of the multiple worksheets; and exporting the multiple worksheets having the mapped and extracted first and second field data into an export file.

While certain embodiments have been described herein, these embodiments are presented by way of example only, and are not intended to limit the scope of the disclosure. Using the teachings in this disclosure, a person having ordinary skill in the art could modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A data processing system, comprising:
processing circuitry configured to:
convert data received from a plurality of field devices to first field data including device type information and second field data including device setting information, each of the plurality of field devices being connected to each other;
send the first field data to a first editor configured to modify the first field data and send the second field data to a second editor configured to modify the second field data;
receive a first source file having the first field data exported from the first editor;
receive a second source file having the second field data exported from the second editor;
filter the first and second field data according to one or more conditions, the filtered first and second field data having at least one common set of data values, a source field name for the at least one common set of data values of the filtered first field data being different from a source field name for the same field data values of the filtered second field data;
categorize the filtered first and second field data into a plurality of categories, the plurality of categories including at least a first category associated with an I/O module (TOM) editor;
generate multiple worksheets based upon the one or more conditions of the filtered first and second field data, the generated multiple worksheets corresponding to the categories;
extract, based on the at least one common set of data values, the filtered first and second field data from source fields of the first source file and the second source file and map the extracted first and second field data into related worksheet fields of the multiple worksheets; and
export the multiple worksheets having the mapped and extracted first and second field data in a single export file.

2. The data processing system of claim 1, wherein the processing circuitry is further configured to export the single export file to an engineering tool for subsequent data processing.

3. The data processing system of claim 2, wherein the subsequent data processing includes at least one of a plant diagnostic application, a plant monitoring application, a validation application, and a testing application.

4. The data processing system of claim 1, wherein the first editor is an input/output (I/O) editor to configure I/O signals for the plurality of field devices.

5. The data processing system of claim 4, wherein the second editor is the IOM editor.

6. The data processing system of claim 1, further comprising:
a cache configured to concurrently receive the first and second field data from the first source file and the second source file, respectively;

a server connected to the first editor and the second editor, via a control network; and one or more databases connected to the first editor and the second editor, via the control network.

7. A method of processing data, the method comprising:

converting data received from a plurality of field devices to first field data including device type information and second field data including device setting information, each of the plurality of field devices being connected to each other;

sending the first field data to a first editor configured to modify the first field data and sending the second field data to a second editor configured to modify the second field data;

receiving a first source file having the first field data exported from the first editor, wherein the first editor is connected to and served by a server and a database, via a control network;

receiving a second source file having the second field data exported from the second editor, wherein the second editor is connected to and served by the server and the database;

filtering the first and second field data from the first source file and the second source file, respectively according to one or more conditions, the filtered first and second field data having at least one common set of data values, a source field name for the at least one common set of data values of the filtered first field data being different from a source field name for the same field data values of the filtered second field data;

categorizing the filtered first and second field data into a plurality of categories, the plurality of categories including at least a first category associated with an I/O module (TOM) editor;

generating, via circuitry, multiple worksheets based upon the one or more conditions of the filtered first and second field data, the generated multiple worksheets corresponding to the categories;

extracting, based on the at least one common set of data values, the filtered first and second field data from source fields of the first source file and the second source file, respectively;

mapping the extracted first and second field data into related worksheet fields of the multiple worksheets; and exporting the multiple worksheets having the mapped and extracted first and second field data into a single export file.

8. The method of claim 7, wherein the one or more conditions include at least one of determining whether:

a device identifier is valid, a required source file is available, an input/output (I/O) tag in the first editor has an I/O module (TOM) assignment, a node used in the first editor exists in the second editor, and the IOM used in the first editor exists in the second editor.

9. The method of claim 7, further comprising:

forwarding the single export file into an engineering tool for subsequent data processing.

10. The method of claim 9, wherein the subsequent data processing includes at least one of a plant diagnostic application, a plant monitoring application, a validation application, and a testing application.

11. The method of claim 7, wherein the first editor is an input/output (I/O) editor to configure I/O signals for the plurality of field devices.

12. The method of claim 11, wherein the second editor is the IOM editor.

13. The method of claim 7, wherein the multiple worksheets include at least one of a device input/output (I/O) worksheet, a device I/O parameter worksheet, a node worksheet, and an I/O module (TOM) worksheet.

14. The method of claim 7, wherein the extracted first and second field data is received from a configuration table.

15. A data generation system, comprising:

a first editor configured to retrieve data from a first database for processing a first source file;

a second editor configured to retrieve data from a second database for processing a second source file; and processing circuitry configured to:

convert data received from a plurality of field devices to first field data including device type information and second field data including device setting information, each of the plurality of field devices being connected to each other;

send the first field data to the first editor configured to modify the first field data and send the second field data to the second editor configured to modify the second field data;

receive the first source file having the first field data exported from the first editor, receive the second source file having the second field data exported from the second editor;

filter first field data from the first source file and second field data from the second source file according to one or more conditions, the filtered first and second field data having at least one common set of data values, a source field name for the at least one common set of data values of the filtered first field data being different from a source field name for the same field data values of the filtered second field data;

categorize the filtered first and second field data into a plurality of categories, the plurality of categories including at least a first category associated with an I/O module (TOM) editor;

generate multiple worksheets and associated worksheet fields based upon the one or more conditions, the generated multiple worksheets corresponding to the categories, extract, based on the at least one common set of data values, the first and second field data from source fields of the first source file and the second source file, respectively;

map the extracted first and second field data into the associated worksheet fields of the multiple worksheets; and export the multiple worksheets having the mapped and extracted first and second field data into a single export file.

16. The data generation system of claim 15, wherein the first and second field data were converted from sensor data received from the plurality of field devices, via a controller.

17. The data generation system of claim 16, wherein the first editor is an input/output (I/O) editor to configure I/O signals for the plurality of field devices.

18. The data generation system of claim 17, wherein the second editor is the IOM editor.

19. The data generation system of claim 15, further comprising:

an engineering tool configured with processing circuitry to receive the single export file for subsequent data processing.

20. The data generation system of claim 19, wherein the subsequent data processing includes at least one of a plant diagnostic application, a plant monitoring application, a validation application, and a testing application.

* * * * *